(12) United States Patent
McBryde et al.

(10) Patent No.: US 7,127,668 B2
(45) Date of Patent: Oct. 24, 2006

(54) DATA MANAGEMENT ARCHITECTURE

(75) Inventors: Lee McBryde, Mt. Airy, MD (US); Gordon Manning, Ellicott City, MD (US); Dave Illar, Ellicott City, MD (US); Richard Williams, Ellicott City, MD (US); Michael Piszczek, Columbia, MD (US)

(73) Assignee: Datadirect Networks, Inc., Chatsworth, CA (US)

( * ) Notice: Subject to any disclaimer, the term of this patent is extended or adjusted under 35 U.S.C. 154(b) by 214 days.

(21) Appl. No.: 09/882,471

(22) Filed: Jun. 14, 2001

(65) Prior Publication Data
US 2001/0056520 A1    Dec. 27, 2001

(51) Int. Cl.
*G06F 11/00* (2006.01)
(52) U.S. Cl. ................................. 714/801; 711/114
(58) Field of Classification Search ............... 711/111, 711/114, 154; 714/800, 801, 821, 757, 726, 714/805; 707/100
See application file for complete search history.

(56) References Cited

U.S. PATENT DOCUMENTS

| | | | |
|---|---|---|---|
| 4,823,347 A * | 4/1989 | Chin et al. ............... 714/800 |
| 5,045,998 A * | 9/1991 | Begun et al. ............ 710/307 |
| 5,146,588 A * | 9/1992 | Crater et al. ............. 714/6 |
| 5,373,512 A * | 12/1994 | Brady ...................... 714/767 |
| 5,388,108 A * | 2/1995 | DeMoss et al. ......... 714/6 |
| 5,396,620 A * | 3/1995 | Burghart et al. ........ 714/6 |
| 5,412,668 A * | 5/1995 | Dewey .................... 714/766 |
| 5,455,939 A | 10/1995 | Rankin et al. |
| 5,463,772 A | 10/1995 | Thompson et al. |
| 5,479,611 A * | 12/1995 | Oyama ..................... 714/48 |
| 5,490,248 A * | 2/1996 | Dan et al. ............... 714/6 |
| 5,574,882 A | 11/1996 | Menon et al. |
| 5,594,862 A | 1/1997 | Winkler et al. |
| 5,668,971 A * | 9/1997 | Neufeld .................. 711/111 |
| 5,737,744 A * | 4/1998 | Callison et al. ......... 711/114 |
| 5,774,641 A * | 6/1998 | Islam et al. .............. 714/6 |
| 5,883,909 A * | 3/1999 | DeKoning et al. ...... 714/800 |
| 5,941,969 A * | 8/1999 | Ram et al. ............... 710/315 |
| 6,151,641 A | 11/2000 | Herbert |
| 6,161,165 A * | 12/2000 | Solomon et al. ........ 711/114 |
| 6,185,652 B1 * | 2/2001 | Shek et al. .............. 710/263 |
| 6,223,301 B1 * | 4/2001 | Santeler et al. .......... 714/6 |
| 6,341,342 B1 * | 1/2002 | Thompson et al. ...... 711/166 |
| 6,370,616 B1 * | 4/2002 | Callison et al. ......... 711/114 |
| 6,460,122 B1 * | 10/2002 | Otterness et al. ....... 711/154 |
| 6,513,098 B1 * | 1/2003 | Allingham ............... 711/114 |
| 6,542,960 B1 * | 4/2003 | Wong et al. ............. 711/114 |
| 6,763,398 B1 * | 7/2004 | Brant et al. .............. 710/8 |
| 6,792,505 B1 * | 9/2004 | Otterness et al. ....... 711/114 |

* cited by examiner

*Primary Examiner*—Guy Lamarre
*Assistant Examiner*—Mujtaba K. Chaudry
(74) *Attorney, Agent, or Firm*—Blakely Sokoloff Taylor & Zafman (57) ABSTRACT

A performance optimized RAID Level 3 storage access controller with a unique XOR engine placement at the host/network side of the cache. The invention utilizes multiple data communications channels and a centralized cache memory in conjunction with this unique XOR placement to maximize performance and fault tolerance between a host network and data storage. Positioning the XOR engine at the host/network side of the cache allows the storage devices to be fully independent. Since the XOR engine is placed in the data path and the parity is generated in real-time during cache write transfers, the bandwidth overhead is reduced to zero. For high performance RAID controller applications, a system architecture with minimal bandwidth overhead provides superior performance.

11 Claims, 10 Drawing Sheets

DATA MANAGEMENT ARCHITECTURE

SUMMARY OF THE INVENTION

The present invention is a performance optimized RAID Level 3 storage access controller with a unique XOR engine placement. The invention utilizes multiple data communications channels and a centralized cache memory in conjunction with this unique XOR placement to maximize performance and fault tolerance between a host network and data storage.

XOR Concept

The concept of XOR parity used in RAID systems utilizes the mathematical properties of the Exclusive OR (XOR) for error coding and correction (ECC). Calculating and storing the parity along with the data gives RAID systems the ability to regenerate the correct data when a fault or error condition occurs. For example, data byte A contains the value of 12 ($00001100_2$) and data byte B contains the value of 15 ($00001111_2$). Using the XOR function across each of the 8 bits in the two bytes, the parity value of 3 ($00000011_2$) is calculated.

$$00001100_2 \wedge 00001111_2 = 00000011_2$$

This parity value is stored along with data bytes A and B. If the storage containing data byte A becomes faulted, then the value of data byte A can be regenerated by calculating the XOR of data byte B and the parity value.

$$00001111_2 \wedge 00000011_2 = 00001100_2$$

Likewise, if the storage containing data byte B becomes faulted, then data byte B can be regenerated by performing the XOR of data byte A and the parity value.

$$00001100_2 \wedge 00000011_2 = 00001111_2$$

XOR Architectural Locations

In a cached RAID Level 3 system, there are three potential positions in the architecture for locating a XOR engine to calculate parity:

1) In the storage side of cache data path (between cache and storage device(s) interface)
2) As a separate port to cache
3) In the host network side of cache data path (between cache and the host(s) network interface)

Figure 1:
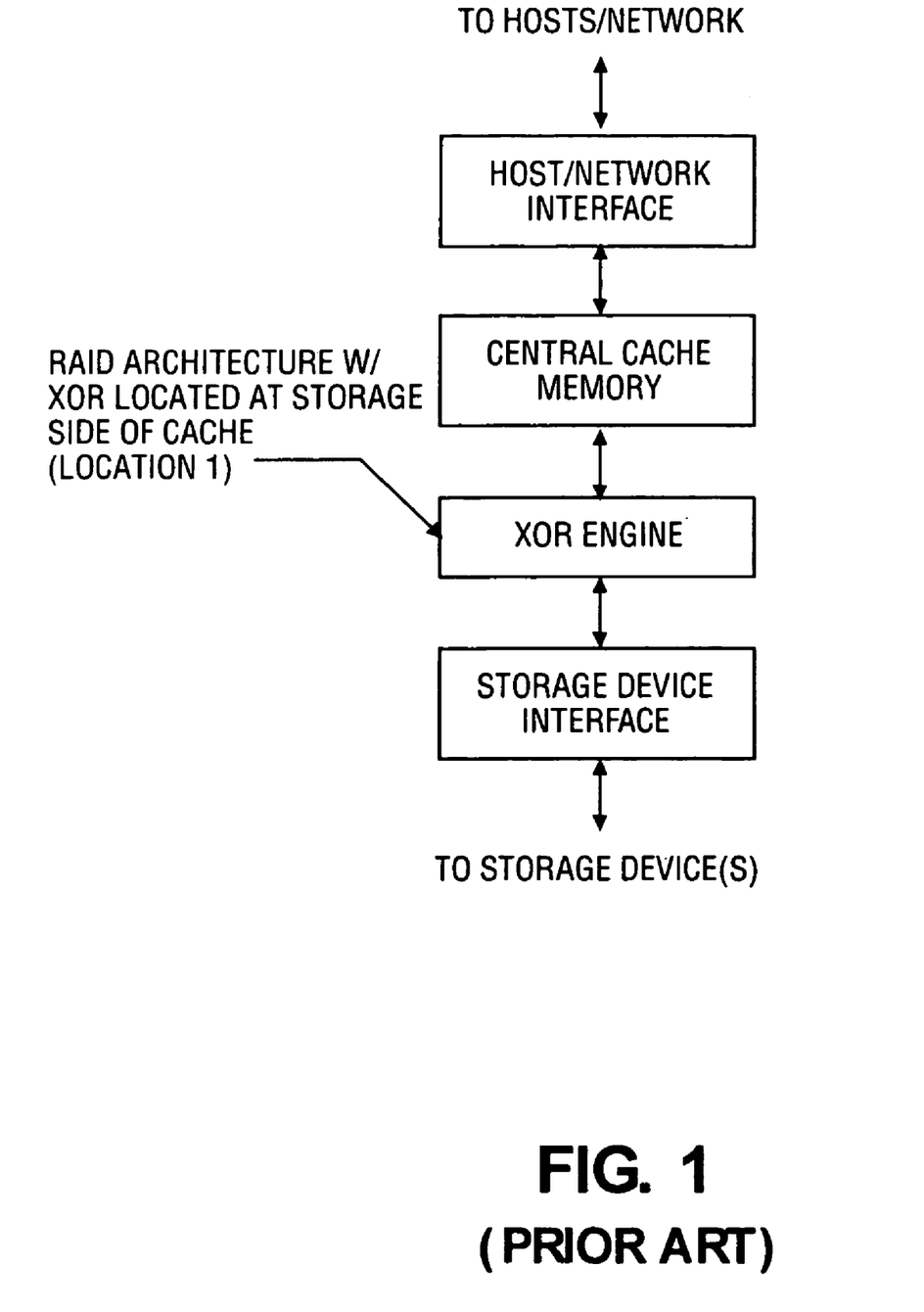
FIG. 1 is a block diagram showing a prior art RAID Level 3 storage access controller architecture.

Positioning the XOR engine in the storage side of cache as shown in FIG. 1, from a hardware perspective, is the easiest place for locating the XOR engine. However, there is a major performance-related, drawback to this solution. Since the parity is generated and stored as the data is written to the storage devices, all of the storage devices involved with a host I/O command must be command-synchronized together i.e.; they must all be performing the same I/O command. This can adversely impact system performance as the slowest device in the command-synchronized set of storage devices governs the system bandwidth. This is an exceptionally large performance problem when the RAID system's storage devices are performing a large amount of "seeks" as is the case for random file transfers.

Figure 2:
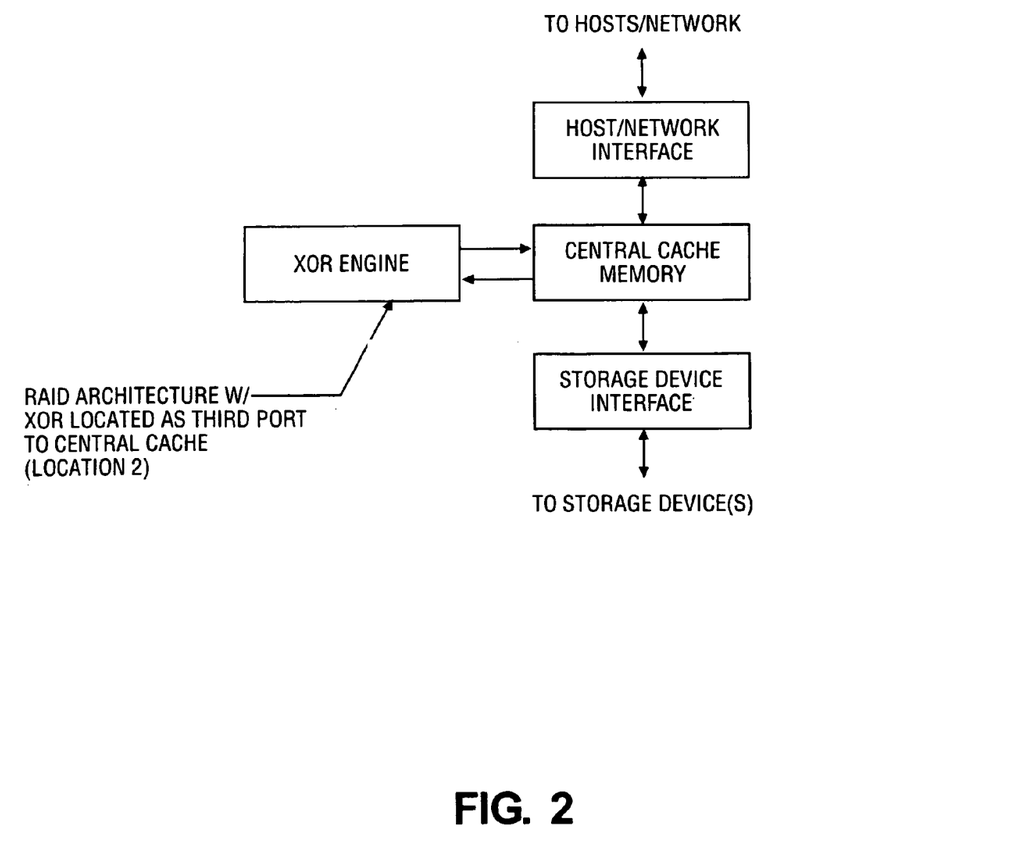
FIG. 2 is a block diagram showing an alternate RAID Level 3 storage access controller architecture.

Positioning the XOR engine as a separate port to cache as shown in FIG. 2 allows the storage devices to be completely independent or command-unsynchronized, because the parity is generated as a separate operation before the data is written to the storage devices. Independent sequences of I/O operations can be issued when the storage devices do not have to wait for each other to initiate a data transfer. In this configuration, the XOR port can be either a software XOR (a CPU reads and XORs the data, producing parity), or a hardware XOR (specialized hardware circuits reads and XORs the data, producing parity) implementation. From a hardware design perspective, this architecture is considerably more complicated in that the cache must be accessible by three independent ports; host/network, storage devices, and the XOR engine. Because the data must be routed from the cache to the XOR port to generate the parity and then back into the cache, over ⅓ of the total cache bandwidth is sacrificed to perform this operation.

Figure 3:
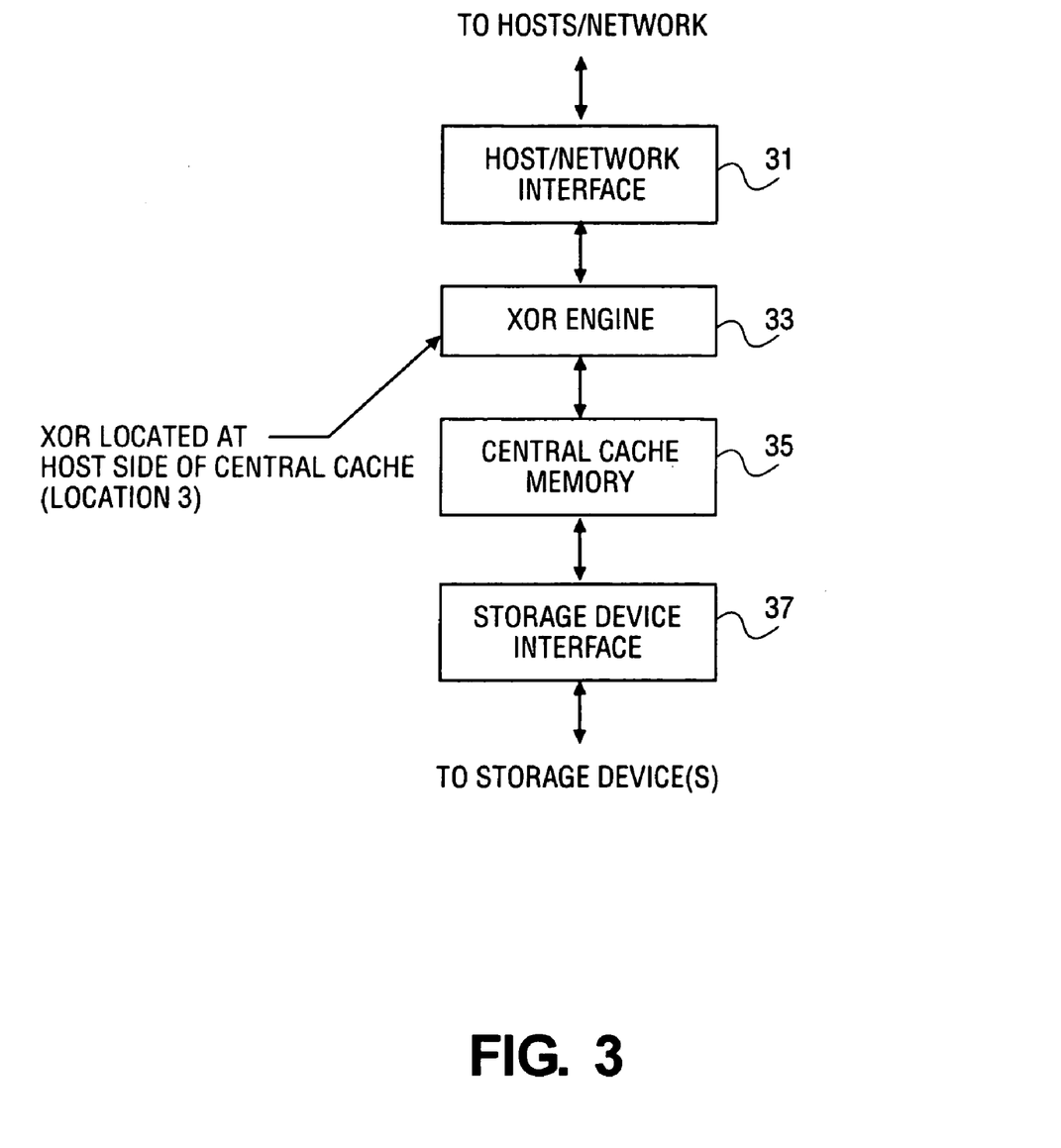
FIG. 3 is a block diagram showing a RAID Level 3 storage access controller architecture according to the present invention.

Positioning the XOR engine at the host/network side of the cache as shown in FIG. 3 allows the storage devices to be fully independent. Since the XOR engine is placed in the data path and the parity is generated in real-time during cache write transfers, the bandwidth overhead is reduced to zero. For high performance RAID controller applications, a system architecture with minimal bandwidth overhead provides superior performance.

Prior art RAID system architectures place the XOR engine on the storage interface side of the cache as described above with reference to FIG. 1. Because of the command synchronization required between storage devices, this architecture's performance becomes directly linked to the worst case seek time of the command-synchronized set of storage devices. In addition, present art storage devices implement a feature called command-tag queuing. This operation enables storage devices to operate on a queue of I/O commands, which allows the storage device to execute I/O instructions in the most efficient order to further improve bandwidth efficiency. But, because of the command-synchronization required in prior art architectures, command-tag queuing cannot be fully utilized to enhance performance.

The Performance Optimized RAID 3 Storage Access Controller Invention

In the invented storage access controller the deficiencies of XOR placement as shown in FIGS. 1 and 2 is eliminated by the novel placement of the XOR engine on the host/network side of the cache as shown in FIG. 3. Because the XOR engine is placed on the host/network side of the cache, the parity is calculated in real-time as the data is received from the host network and is stored in the cache along with the data. When the data is transferred to the storage devices, all the storage device communication channels can run command-unsynchronized, utilizing the maximum bandwidth of the storage device channels.

Since the storage devices are no longer command-synchronized in this invented architecture, command-tag queuing can now be used to further enhance system performance. This characteristic of the invention becomes more important as tiers of storage devices are added. When there are multiple tiers of storage devices, this invention provides superior performance as "seeks" become hidden i.e.,; transparent to bandwidth overhead. One or many storage device can be "seeking" its data, while another is transferring data over the communications channel to or from the cache memory. This time-multiplexing scheme of seeks and active communications allows the invented architecture to outperform prior art architectures. The unique positioning of the XOR engine at the host network side of the cache is the performance-enabling characteristic of this invention.

DETAILED DESCRIPTION OF THE INVENTION

The performance-optimized storage access controller invention is a RAID controller with the parity XOR engine located on the host/network side of the centralized data cache. The unique position of the XOR digital circuitry enables this invention to maximize data transfer bandwidth with minimal parity calculation overhead.

Host/Network Interface

Figure 4:
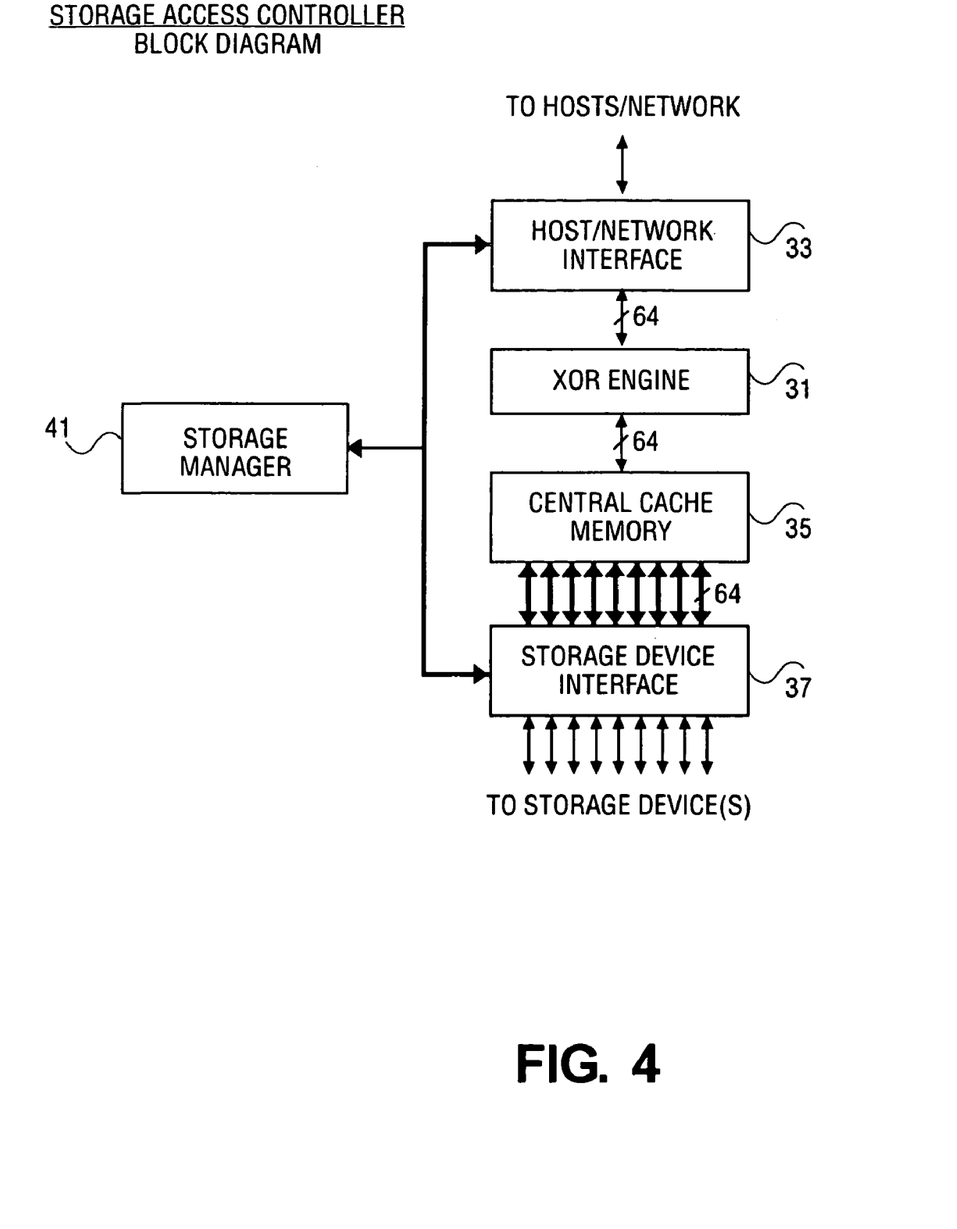
FIG. 4 is a block level diagram of a storage access controller of a type which may be used in the present invention.

Referring to FIG. 3, the invention utilizes a host/network interface 31 that communicates with an XOR engine 33 and a central cache memory 35 that communicates with both the XOR engine 33 and storage device interface(s) 37. A storage manager 41 provides I/O command decoder and control functions and manages the allocation and utilization of the central cache memory as shown in FIG. 4. The host/network interface 31 is a communications interface to a host computer or network of computers. In one embodiment, the invention maintains a ANSI X3T11 fiber channel interface utilizing a SCSI command set on the front end, but other combinations of interfaces and protocols could be substituted (TC/IP, ETHERNET, INFINIBAND, etc.). The back end of this interface is a bi-directional parallel data bus consisting of 64 data bits. Other data bus widths could be used as long as they are modulo-2 (2,4,8,16,32, . . . ). The host/network interface 31 translates and decodes fiber channel commands into data and non-data commands. Non-data commands are buffered for further decoding by the storage manager, and data commands are decoded for host read and host write operations. Host write commands route data from the host/network interface 31 to the XOR engine 33 and host read commands setup transfers from the cache memory 35 through the XOR engine to the host network interface 33.

Figure 5:
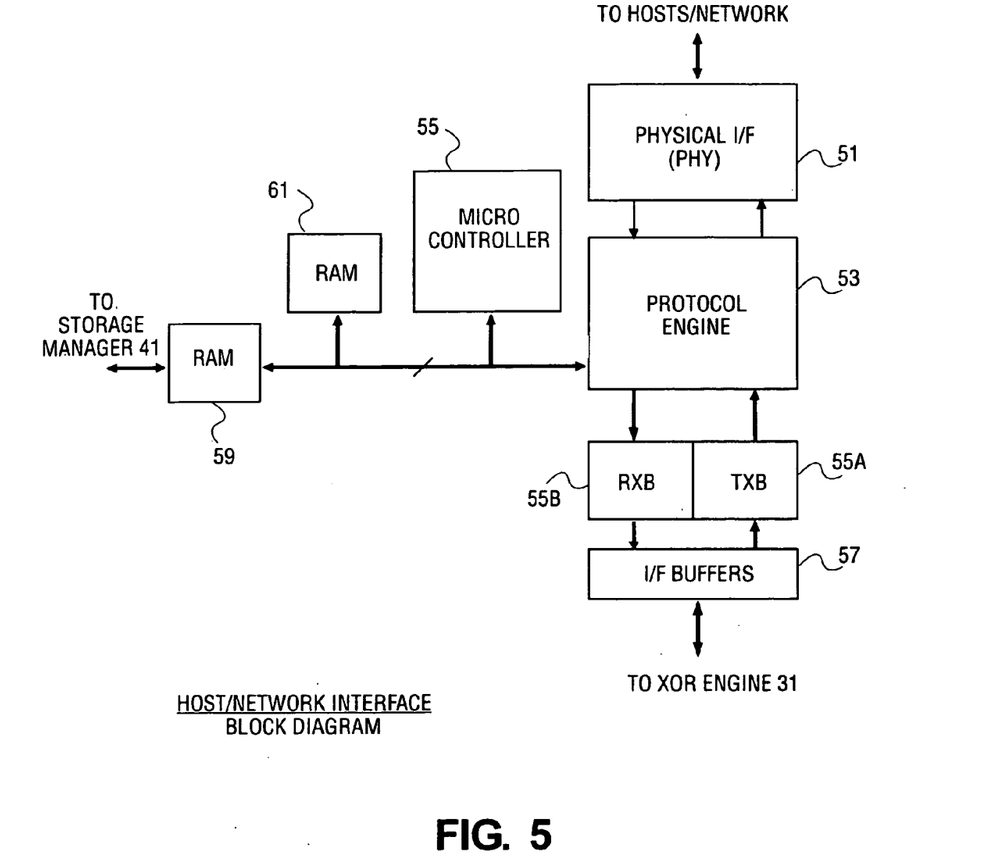
FIG. 5 is a block level diagram of a host/network interface of a type which may be used in the present invention.

In this connection, referring to FIG. 5, host/network interface 31 is implemented in a custom ASIC (Application Specific Integrated Circuit) This ASIC utilizes a physical interface 51, e.g., Gigablaze™ transceiver by LSI Logic Inc. and a protocol engine 53 which is implemented with LSI Logic Inc's. Merlin™ Fibre Channel core. The transmit buffer 55a and receive buffer 55b are implemented by dual-ported SRAMs cells with custom logic circuits to control addresses modes. These custom logic circuits may be implemented with standard binary counters. In one embodiment, a 15 bit binary counter is used to calculate the write address of the buffer and a 15 bit counter is used to calculate the read address. FIFO writes cause the write counter to increment and FIFO reads cause the read counter to increment. The transmit buffer is 10 KB deep and the receive buffer is 12 KB deep. The host/network interface 31 operates under control of a microcontroller 63 such as a 32 bit MIPS™ ISA running at 53.125 Mhz 63. This microcontroller may be implemented using the TinyRISC™ core available from LSI Logic Inc. The micro-controller 63 is supported by an internal 8K×32 SRAM and externally by a IDT70V25 8K×16 dual-port SRAM for inter-processor communications 61 to the storage manager.

XOR Engine

Figure 6:
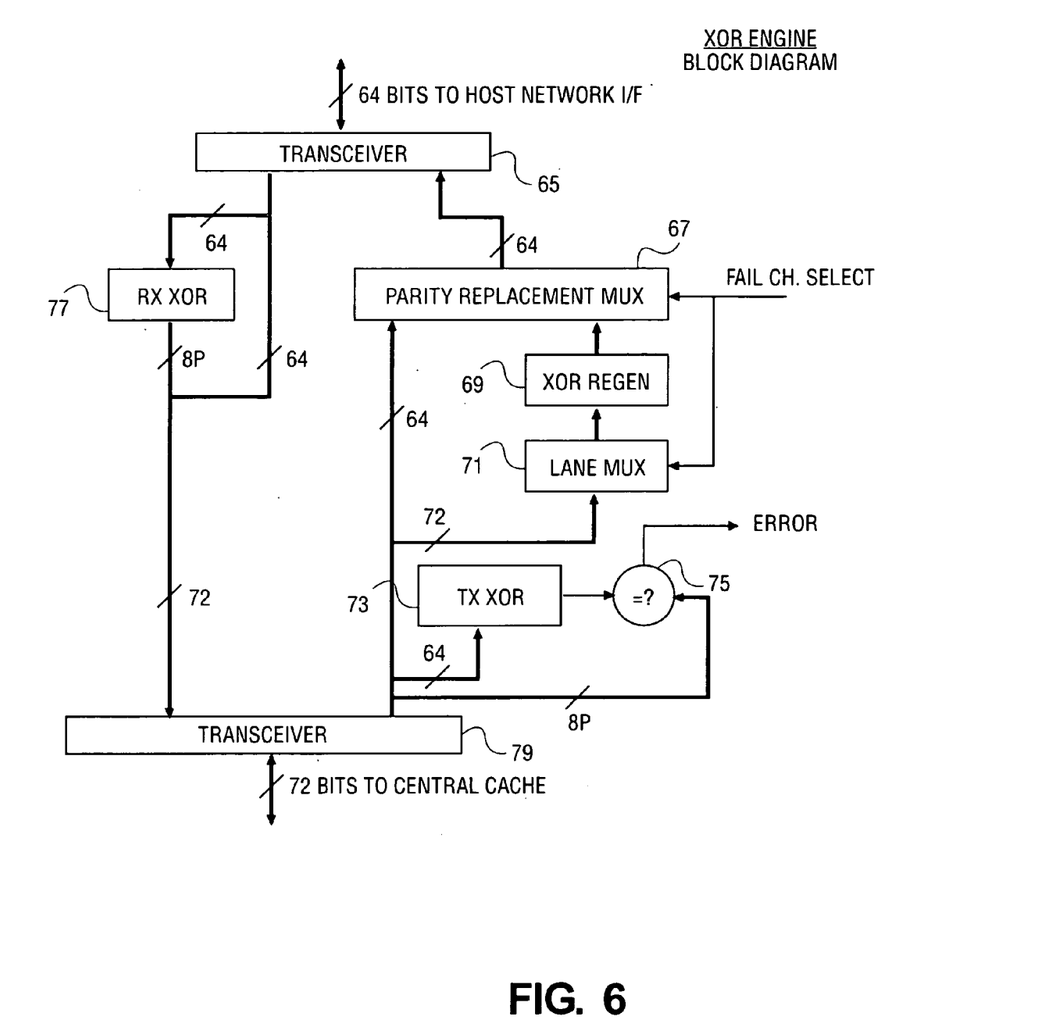
FIG. 6 is a block level diagram of an XOR engine of a type which may be used in the present invention.

The XOR engine 33 resides between the host/network interface 31 and the central cache memory 35 as noted above. The XOR engine performs three functions; generate XOR parity, check XOR parity, and regenerate incorrect data i.e.; correct errors. Using pipelined register sets, the XOR engine can calculate, check, and correct in real-time during data transfers. Referring to FIG. 6, which illustrates a block diagram of an embodiment of an XOR engine suitable for use with the invention, the XOR engine receives a bi-directional 64 bit bus from the host/network interface via transceiver 65. During a host write data transfer, the XOR engine calculates an 8 bit parity byte by XORing the 64 data bits from the host/network interface.

This XOR byte is calculated as follows:

Parity Bit[00]=D[00]∧D[08]∧D[16]∧D[24]∧D[32] ∧D[40]∧D[48]∧D[56]

Parity Bit[01]=D[01]∧D[09]∧D[17]∧D[25]∧D[33] ∧D[41]∧D[49]∧D[57]

Parity Bit[02]=D[02]∧D[10]∧D[18]∧D[26]∧D[34] ∧D[42]∧D[50]∧D[58]

Parity Bit[03]=D[03]∧D[11]∧D[19]∧D[27]∧D[35] ∧D[43]∧D[51]∧D[59]

Parity Bit[04]=D[04]∧D[12]∧D[20]∧D[28]∧D[36] ∧D[44]∧D[52]∧D[60]

Parity Bit[05]=D[05]∧D[13]∧D[21]∧D[29]∧D[37] ∧D[45]∧D[53]∧D[61]

Parity Bit[06]=D[06]∧D[14]∧D[22]∧D[30]∧D[38] ∧D[46]∧D[54]∧D[62]

Parity Bit[07]=D[07]∧D[15]∧D[23]∧D[31]∧D[39] ∧D[47]∧D[55]∧D[63]

The XOR parity byte is then appended to the 64 bit data word making a 72 bit word that is transferred directly to the cache memory on a bi-directional 72 bit data bus. In addition, standard byte parity is added to protect each of the 9 data bytes on the 72 bit bus.

During host read transfers, the 72 data bits are received from the cache memory on the same 72 bit data bus. The XOR engine calculates XOR parity on the lower 64 data bits using the same XOR algorithm as a host write XOR. The calculated XOR parity byte is then XORed with the upper byte of the 72 bit data bus according to the following equations:

$$\text{Error Bit}[00] = D[64] \wedge \text{Parity Bit}[00]$$

$$\text{Error Bit}[01] = D[65] \wedge \text{Parity Bit}[01]$$

$$\text{Error Bit}[02] = D[66] \wedge \text{Parity Bit}[02]$$

$$\text{Error Bit}[03] = D[67] \wedge \text{Parity Bit}[03]$$

$$\text{Error Bit}[04] = D[68] \wedge \text{Parity Bit}[04]$$

$$\text{Error Bit}[05] = D[69] \wedge \text{Parity Bit}[05]$$

$$\text{Error Bit}[06] = D[70] \wedge \text{Parity Bit}[06]$$

$$\text{Error Bit}[07] = D[71] \wedge \text{Parity Bit}[07]$$

If any of the error bits are non-zero, a XOR parity error is indicated. The error can then be localized to a byte group by either decoding the byte parity bits or by inquiry of the storage devices. If an error is detected and the errored byte lane is decoded, the XOR engine provides for error correction by including a set of replacement multiplexers along with a XOR parity regenerator.

In the case of data regeneration, the errored byte lane data is replaced with the parity byte (D[71:64]) and then parity is recalculated on this 64 bit word. The resulting 8 bit code is the regenerated data byte for the errored byte lane. This data is then substituted into the appropriate byte lane for transfer as a 64 bit word to the host/network interface over the 64 bit bi-directional data bus.

In this connection, referring to FIG. 6, XOR engine 31 utilizes a custom ASIC in which the RX XOR 77 and TX XOR 73 functions may be implemented using standard 2-input Boolean Exclusive-OR (XOR) gates. Likewise, XOR regen 69, which is used to regenerate the Exclusive OR parity data under a fault condition, may be implemented using the same standard 2-input Boolean XOR gates. Parity error detector 75 may also implemented with an array of 2-input XOR gates wired to check each bit of the parity data with each bit of the 8 transmit generated XOR bits.

The lane MUX 71 and the parity replacement MUX 67 are implemented using muliplexers. The lane MUX is wired as eight 9:1 multiplexers with a four bit selection code indicated by the FAIL CH. SELECT inputs. These input signals are generated whenever there is any bad data channel to the storage device interface 37. The parity replacement MUX may be implemented as sixty-four 2:1 multiplexers to select either correct 64 bit data directly from the transceiver 65 or regenerated 64 bit data from XOR regen 69.

Transceivers 65 and 79 may be implemented using tristate enabled bi-directional I/O buffers.

Central Cache Memory 35

Figure 7:
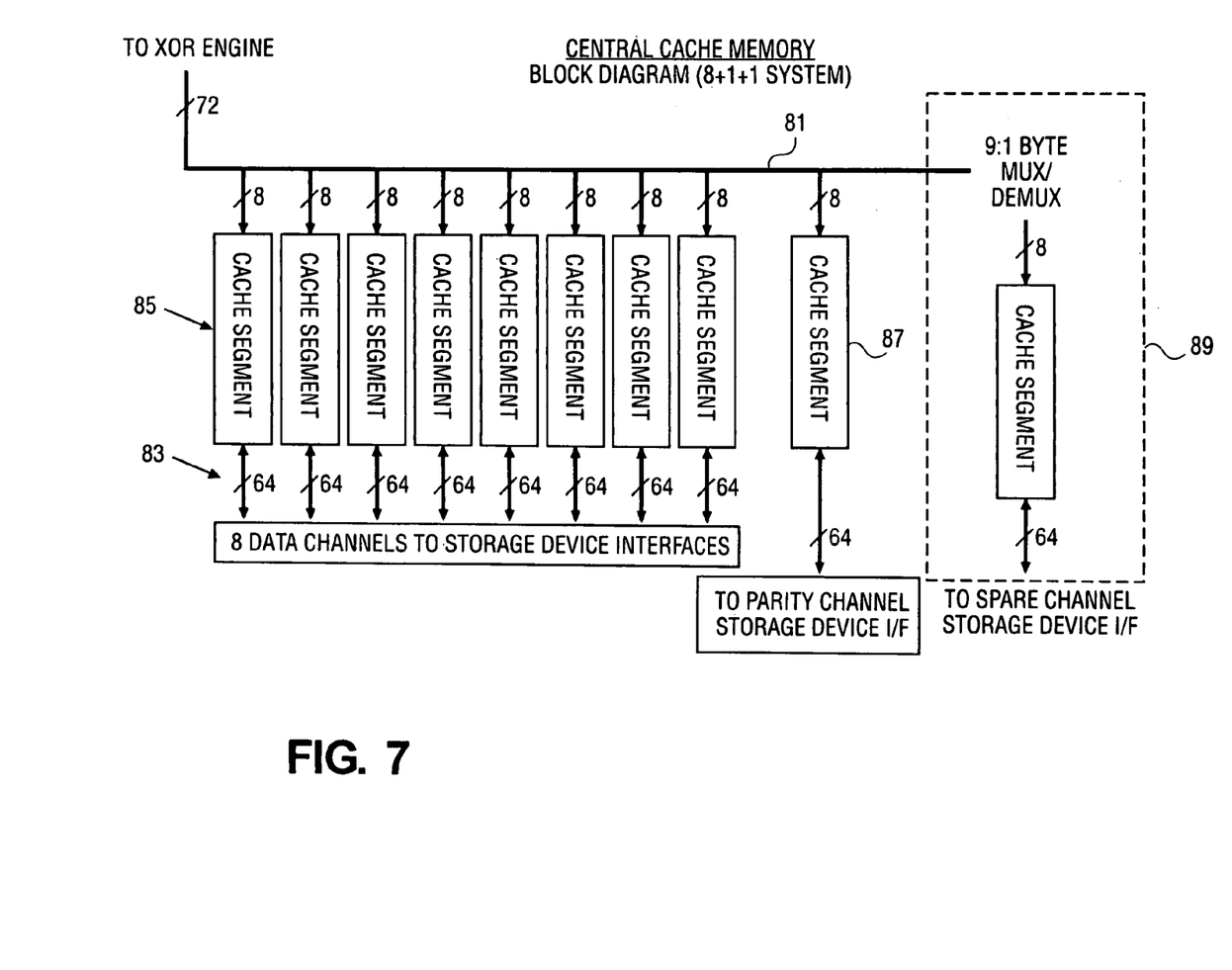
FIG. 7 is a block level diagram of a central cache memory of a type which may be used in the present invention.

The central cache memory is a solid-state dual port memory array that performs the RAID Level 3 striping and is illustrated in FIG. 7. The cache memory has a 72 bit bi-directional bus 81 to communicate with the XOR engine and individual 64 bit bi-directional buses 83 to communicate with each of the storage device interfaces. The supported number of storage interfaces must also be modulo-2, plus at least one to support the XOR parity. The invented storage access controller maintains eight storage interfaces 85 for data, one storage interface 87 for parity, and one mapable storage interface 87 for a fault tolerance spare. This configuration is referred to as "8+1+1".

Figure 8:
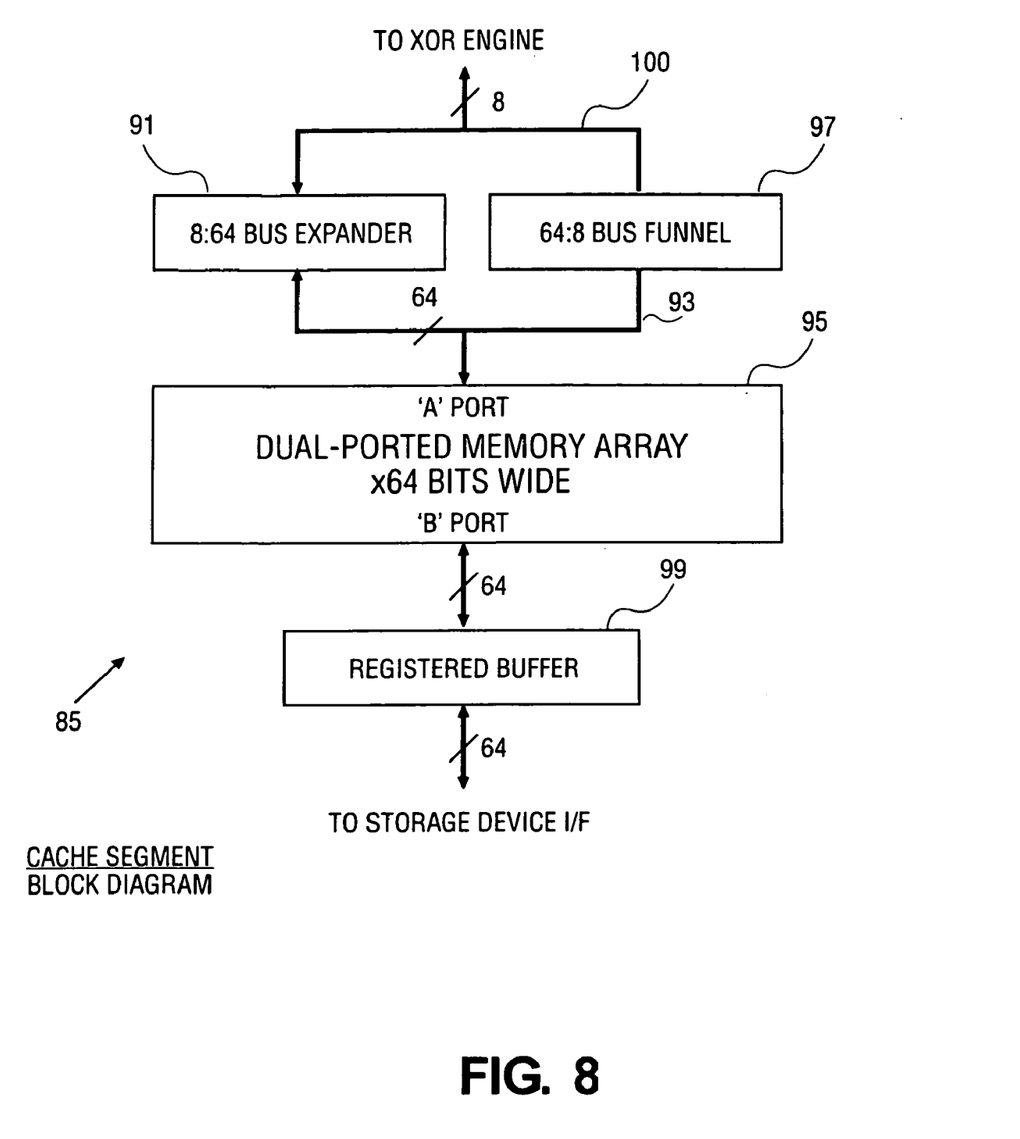
FIG. 8 is a block level diagram of a cache segment of a type used in the central cache memory of FIG. 7.

Referring to FIG. 8, during a host/network write, the 72 bits of data are received at the central cache memory from the XOR engine in a series of bus-expanders 91. The function of these bus expanders is to split the 72 bit bus into 9 byte lanes. Each byte lane can then be time-demultiplexed to build a 64 bit bus 93. The result is nine 64 bit wide buses each feeding its own cache memory segment. Each 64 bit bus feeds an 'A' port of the dual port memory array segments 95. Performing this time-demultiplexing function on the incoming data creates RAID Level 3 striped data when the data is stored in central cache memory array.

Once all the RAID 3 data is present in cache. The data becomes accessible by the storage device interfaces through the 'B' port of the memory segments through registered buffer 99 which is implemented by standard bi-directional transceiver devices. Since all the data for a particular I/O command is present in cache, each of the storage device interfaces can now operate independently on their memory segment. This is the feature that allows the invention to take advantage of advanced disk drive features such as Command-Tag Queuing where interleaving and re-ordering reads and writes maximizes the performance of the storage devices.

During a host/network read function, each of the storage device interfaces independently reads their assigned blocks of data from the storage devices according to their own command queues. Once the data associated with this I/O command has been transferred from all of the storage device interfaces to the cache through the 'B' port, a transfer is initiated from the cache through the XOR engine to the host/network interface. The data is retrieved from the memory segments through the 'A' ports. The 64 bit buses are fed into bus-funnels 97 that time multiplex the data onto a 8 bit bus. These 8 bit buses or byte lanes are concatenated together to form the 72 bit bus that feeds the XOR machine.

Storage Device Interface 37

The storage device interface 37 are communications interfaces that transfer data between the individual cache memory segments 85 of the central cache memory and storage devices. In one embodiment, the invented storage access controller uses fiber channel with a SCSI protocol for this interface, but other interfaces and protocols supported by storage devices can be used. The storage device interface communicates with the cache memory segments over a 64 bit bi-directional bus and manages the protocol stack for translating the 64 bit bus to the protocol required of the storage devices.

Figure 9:
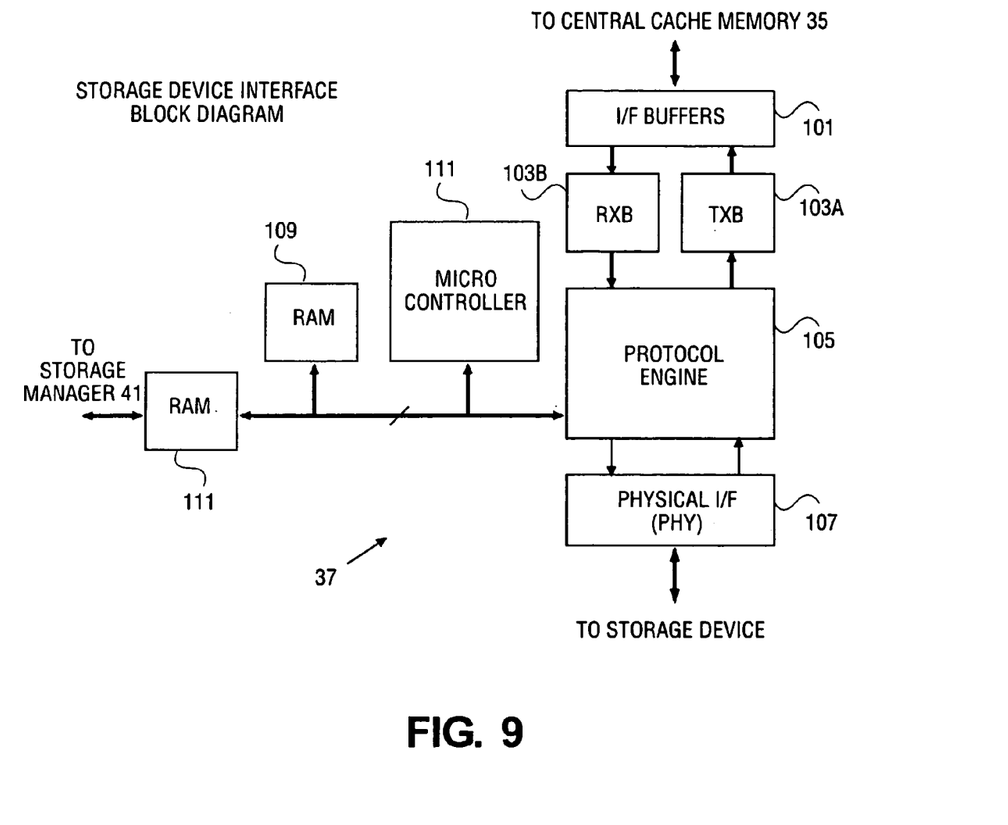
FIG. 9 is a block level diagram of a storage device interface of a type which may be used in the present invention.

As shown in FIG. 9, storage device interface 37 utilizes the same custom ASIC device used for the host/network interface, which contains a Gigablaze™ transceiver for the physical interface 107, a Merlin™ Fibre Channel core for the protocol engine 105 and a TinyRISC™ MIPs processor for the micro-controller 111. The micro-controller is supported by 8K words of internal SRAM. Receive and transmit buffers are implemented as internal dual port SRAM cells 103A and 103B and the interface buffers 101 are standard ASIC I/O buffer cells. An external IDT70V25 8K×16 dual-port SRAM is utilized for inter-processor communication with the storage manager.

The Storage Manager

The storage manager 41, as described above with reference to FIG. 4, is a digital computer subsystem that has access to both the host/network interfaces and the storage devices interfaces. The storage manager is responsible for decoding host/network interfaces commands that have been parsed by the host/network interface. In response to these commands, control information is transmitted to both the host/network interface and the storage device interfaces for directing data traffic between the central cache and the network and storage interfaces. This subsystem also provides the cache functions for allocating and managing cache memory space.

Figure 10:
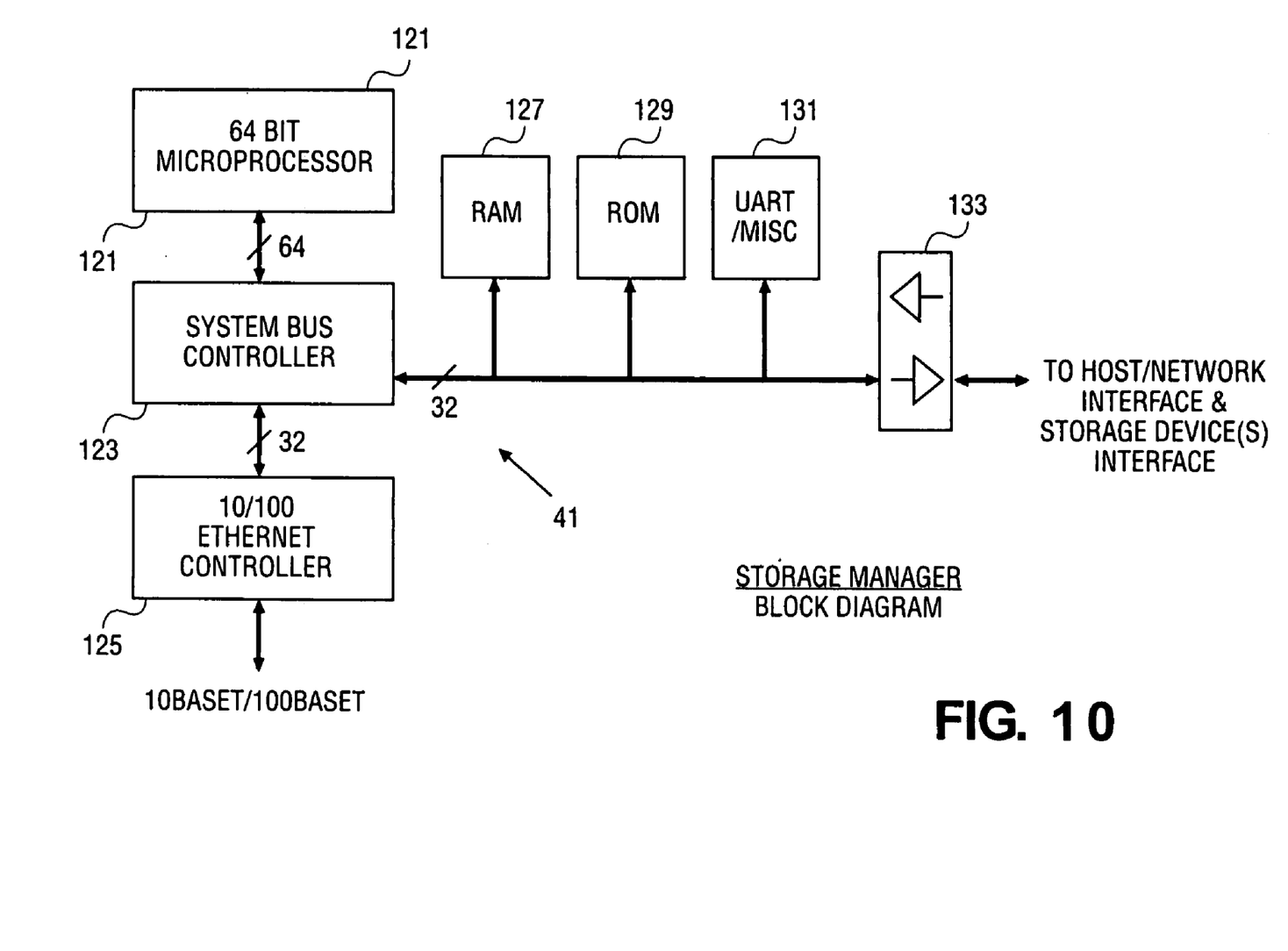
FIG. 10 is a block level diagram of a storage manager of a type which may be used in the present invention.

As shown in FIG. 10, storage manger 41 utilizes a microprocessor 121 such as 100 MHz MIPS™ 64 bit microprocessor (IDT4650) supported by a FT-64010 system controller 123 and a I82558 Ethernet controller 125. Processor RAM is implemented by 16 MB of fast page mode dynamic random access memory (DRAM) 127 and ROM 129 is implemented by 4 MB of FLASH memory. System communications ports 131 are supported by 16550 UARTs and communications to host network and storage interfaces are done through standard bi-directional transceivers.

We claim:

1. A data management architecture comprising:
   a) an XOR engine;
   b) a host network interface coupled to said XOR engine and for coupling to a host computer system;
   c) a cache coupled to said XOR engine;
   d) a storage device interface coupled to said cache and for coupling to a plurality of storage devices,
   wherein said XOR engine includes:
   a first transceiver coupled to said host network interface;
   logic means for i) generating an XOR parity byte using said data and appending said parity byte to said data, ii) checking XOR parity, and iii) correcting detected parity errors;
   a second transceiver coupled to said cache.

2. The data management architecture defined by claim 1 wherein said host network interface comprises:
   a) a physical interface;
   b) a protocol engine coupled to the physical interface;
   c) a receive buffer coupled to the protocol engine;
   d) a transmit buffer coupled to the protocol engine;
   e) interface buffers coupled to the transmit and receive buffers;
   f) a bus coupled to the protocol engine;
   g) a microcontroller coupled to the bus;
   h) a memory coupled to the bus.

3. The data management architecture defined by claim 1 wherein said cache comprises:
   a plurality of cache segments, each of said cache segments including i) a dual port memory array, ii) a bus expander coupled between said XOR engine and said dual port memory array, iii) a bus funnel coupled between said XOR engine and said dual port memory array, and iv) a buffer coupled between said storage device interface and said dual port memory.

4. The data management architecture defined by claim 1 wherein said storage device interface comprises:
   a) a physical interface;
   b) a protocol engine coupled to the physical interface;
   c) a receive buffer coupled to the protocol engine;
   d) a transmit buffer coupled to the protocol engine;
   e) interface buffers coupled to the transmit and receive buffers;
   f) a bus coupled to the protocol engine;
   g) a microcontroller coupled to the bus;
   h) a memory coupled to the bus.

5. A data management architecture comprising:
   a) an XOR engine;
   b) a host network interface coupled to said XOR engine and for coupling to a host computer system;
   c) a cache coupled to said XOR engine, said cache including a plurality of cache segments, each of said cache segments including i) a dual port memory array, ii) a bus expander coupled between said XOR engine and said dual port memory array, iii) a bus funnel coupled between said XOR engine and said dual port memory array, and iv) a buffer coupled between said storage device interface and said dual port memory;
   d) a storage device interface coupled to said cache and for coupling to a plurality of storage devices,
   wherein said XOR engine includes:
   a first transceiver coupled to said host network interface;
   logic means for i) generating in real time an XOR parity byte using said data and appending said parity byte to said data, ii) checking in real time XOR parity, and iii) correcting in real time detected parity errors;
   a second transceiver coupled to said cache.

6. A data management architecture comprising:
   a) an XOR engine which operates to generate in real time an XOR parity byte using said data and append said parity byte to said data, ii) check in real time XOR parity, and iii) correct in real time detected parity errors;
   b) a host network interface coupled to said XOR engine and for coupling to a host computer system;
   c) a cache coupled to said XOR engine;
   d) a storage device interface coupled to said cache and for coupling to a plurality of storage devices.

7. The data management architecture defined by claim 6 wherein said host network interface comprises:
   a) a physical interface;
   b) a protocol engine coupled to the physical interface;
   c) a receive buffer coupled to the protocol engine;
   d) a transmit buffer coupled to the protocol engine;
   e) interface buffers coupled to the transmit and receive buffers;
   f) a bus coupled to the protocol engine;
   g) a microcontroller coupled to the bus;
   h) a memory coupled to the bus.

8. The data management architecture defined by claim 6 wherein said cache comprises:
   a plurality of cache segments, each of said cache segments including i) a dual port memory array, ii) a bus expander coupled between said XOR engine and said dual port memory array, iii) a bus funnel coupled between said XOR engine and said dual port memory array, and iv) a buffer coupled between said storage device interface and said dual port memory.

9. The data management architecture defined by claim 6 wherein said storage device interface comprises:
   a) a physical interface;
   b) a protocol engine coupled to the physical interface;
   c) a receive buffer coupled to the protocol engine;
   d) a transmit buffer coupled to the protocol engine;
   e) interface buffers coupled to the transmit and receive buffers;
   f) a bus coupled to the protocol engine;
   g) a microcontroller coupled to the bus;
   h) a memory coupled to the bus.

10. A data management architecture comprising:
a) an XOR engine;
b) a host network interface coupled to said XOR engine and for coupling to a host computer system;
c) a cache coupled to said XOR engine;
d) a storage device interface coupled to said cache and for coupling to a plurality of storage devices,
wherein said XOR engine includes:
a first transceiver coupled to said host network interface;
logic means for i) generating in real time an XOR parity byte using said data and appending said parity byte to said data, ii) checking in real time XOR parity, and iii) correcting in real time detected parity errors;
a second transceiver coupled to said cache.

11. A data management architecture comprising:
a) an XOR engine;
b) a host network interface coupled to said XOR engine and for coupling to a host computer system;
c) a cache coupled to said XOR engine, said cache including a plurality of cache segments, each of said cache segments including i) a dual port memory array, ii) a bus expander coupled between said XOR engine and said dual port memory array, iii) a bus funnel coupled between said XOR engine and said dual port memory array, and iv) a buffer coupled between said storage device interface and said dual port memory;
d) a storage device interface coupled to said cache and for coupling to a plurality of storage devices,
wherein said XOR engine includes:
a first transceiver coupled to said host network interface;
logic means for i) generating in real time an XOR parity byte using said data and appending said parity byte to said data, ii) checking in real time XOR parity, and iii) correcting in real time detected parity errors;
a second transceiver coupled to said cache.

* * * * *